US012784212B2

(12) United States Patent
Otomaru

(10) Patent No.: US 12,784,212 B2
(45) Date of Patent: Nov. 3, 2026

(54) IMAGE PROCESSING APPARATUS AND IMAGE PROCESSING METHOD

(71) Applicant: CANON KABUSHIKI KAISHA, Tokyo (JP)

(72) Inventor: Itaru Otomaru, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 18/928,483

(22) Filed: Oct. 28, 2024

(65) Prior Publication Data

US 2025/0148594 A1 May 8, 2025

(30) Foreign Application Priority Data

Nov. 7, 2023 (JP) ................................ 2023-190035

(51) Int. Cl.
*G06T 7/00* (2017.01)
*G06T 7/70* (2017.01)
(Continued)

(52) U.S. Cl.
CPC .............. *G06T 7/0012* (2013.01); *G06T 7/70* (2017.01); *G06T 15/00* (2013.01); *G06V 10/44* (2022.01);
(Continued)

(58) Field of Classification Search
CPC ......... G06T 7/0012; G06T 7/70; G06T 15/00; G06V 10/44
See application file for complete search history.

(56) References Cited

U.S. PATENT DOCUMENTS 8,496,590 B2 * 7/2013 Abe .................... G01S 7/52074 600/443
10,157,486 B2 12/2018 Otomaru
(Continued)

FOREIGN PATENT DOCUMENTS

| | | |
|---|---|---|
| JP | 2011239890 A | 12/2011 |
| WO | 2016195110 A1 | 12/2016 |
| WO | 2016195110 W | 12/2016 |

OTHER PUBLICATIONS

Amano, T. et al., "An Appearance Based Fast Linear Pose Estimation" NAIST, Workshop in conjunction with ICCV2009 (Sep. 2009) pp. 1-14.

*Primary Examiner* — David Bilodeau
(74) *Attorney, Agent, or Firm* — Carter, DeLuca & Farrell LLP

(57) ABSTRACT

An image processing apparatus includes a processor; and a memory storing a program which, when executed by the processor, causes the image processing apparatus to: an image acquisition processing to acquire a three-dimensional image containing a subject as an object to be imaged, an intersecting cross-section acquisition processing to acquire, from the three-dimensional image, information on a plurality of intersecting cross-sections that intersect with a prescribed reference cross-section, an intersecting line information acquisition processing to, on a basis of the information on the plurality of intersecting cross-sections, acquire intersecting line information that represents information on intersecting lines where the plurality of intersecting cross-sections intersect with the reference cross-section, and a cross-section information acquisition processing to, on a basis of the intersecting line information, acquire reference cross-section information that represents information on the reference cross-section.

20 Claims, 12 Drawing Sheets

(51) Int. Cl.
*G06T 15/00* (2011.01)
*G06V 10/44* (2022.01)

(52) U.S. Cl.
CPC ............... *G06T 2207/10081* (2013.01); *G06T 2207/10088* (2013.01); *G06T 2207/10132* (2013.01); *G06T 2207/30048* (2013.01)

(56) References Cited

U.S. PATENT DOCUMENTS

| | | | | |
|---|---|---|---|---|
| 10,268,918 | B2 | 4/2019 | Otomaru | |
| 10,867,423 | B2 | 12/2020 | Otomaru | |
| 2012/0093388 | A1* | 4/2012 | Masumoto ............ | G06T 7/0012 382/134 |
| 2022/0230346 | A1 | 7/2022 | Otomaru | |
| 2022/0366537 | A1 | 11/2022 | Otomaru | |
| 2023/0298174 | A1 | 9/2023 | Otomaru | |
| 2023/0401709 | A1* | 12/2023 | Sasuga .................... | G06T 19/00 |
| 2024/0161379 | A1 | 5/2024 | Otomaru | |

* cited by examiner

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

When performing diagnoses using medical images, there are cases where three-dimensional images (volume data) are cut on the basis of prescribed standards to acquire two-dimensional cross-sections (reference cross-sections) representing the cutting surfaces of the images, and images of the cross sections (reference cross-section images) are then displayed on screens or the like. Further, there are cases where image processing is applied to reference cross-section images to perform shape measurement, abnormal detection, or the like on organs. However, manual settings for the reference cross-sections require operations to search for anatomical landmarks (feature points) or the like as clues in three-dimensional spaces, causing significant burdens on doctors or the like.

In order to solve this problem, for example, the paper "An Appearance Based Fast Linear Pose Estimation" provided at MVA 2009 IAPR Conference on Machine Vision Applications by Toshiyuki Amano et. al. proposes a technology to correct the initial value of a reference cross-section obtained through rough settings by doctors or the like or automatic estimation based on rough estimates, thereby calculating a high-precision reference cross-section while reducing the burden caused by manual settings.

Further, WO 2016/195110 proposes detection of anatomical feature points on a peripheral cross-section obtained from a specific reference cross-section and correction of the reference cross-section using an axis passing through the midpoint between the feature points.

Further, Japanese Patent Application Laid-open No. 2011-239890 proposes manual input, by a user, of the intersecting line of a reference cross-section that intersects with a specific cross-section so as to update the reference cross-section using information on the intersecting line.

However, according to the methods described in these related arts, a prescribed start point is first set, and then a reference cross-section is calculated on the basis of information on the periphery of the start point. Therefore, there are cases where satisfactory reference cross-section estimation may not be achieved, for example, when the image quality of the peripheral region of the start point is low in an input three-dimensional image.

SUMMARY OF THE INVENTION

The present disclosure has been made in view of the above and has an object of providing a technology capable of improving estimation performance when estimating a reference cross-section for three-dimensional images.

According to some embodiments, an image processing apparatus includes a processor; and a memory storing a program which, when executed by the processor, causes the image processing apparatus to: perform an image acquisition processing to acquire a three-dimensional image containing a subject as an object to be imaged; perform an intersecting cross-section acquisition processing to acquire, from the three-dimensional image, information on a plurality of intersecting cross-sections that intersect with a prescribed reference cross-section; perform an intersecting line information acquisition processing to, on a basis of the information on the plurality of intersecting cross-sections, acquire intersecting line information that represents information on intersecting lines where the plurality of intersecting cross-sections intersect with the reference cross-section; and perform a cross-section information acquisition processing to, on a basis of the intersecting line information, acquire reference cross-section information that represents information on the reference cross-section.

According to some embodiments, an image processing method includes acquiring a three-dimensional image containing a subject as an object to be imaged; acquiring, from the three-dimensional image, information on a plurality of intersecting cross-sections intersecting with a prescribed reference cross-section; acquiring intersecting line information that represents information on intersecting lines where the plurality of intersecting cross-sections intersect with the reference cross-section, on a basis of the information on the plurality of intersecting cross-sections; and acquiring reference cross-section information that represents information on the reference cross-section, on a basis of the intersecting line information.

According to some embodiments, an image processing apparatus includes an image acquisition unit configured to acquire a three-dimensional image containing a subject as an object to be imaged; an intersecting cross-section acquisition unit configured to acquire, from the three-dimensional image, information on a plurality of intersecting cross-sections that intersect with a prescribed reference cross-section; an intersecting line information acquisition unit configured to, on a basis of the information on the plurality of intersecting cross-sections, acquire intersecting line information that represents information on intersecting lines where the plurality of intersecting cross-sections intersect with the reference cross-section; and a cross-section information acquisition unit configured to, on a basis of the intersecting line information, acquire reference cross-section information that represents information on the reference cross-section.

Further features of the present invention will become apparent from the following description of exemplary embodiments with reference to the attached drawings.

DESCRIPTION OF THE EMBODIMENTS

Figure 1:
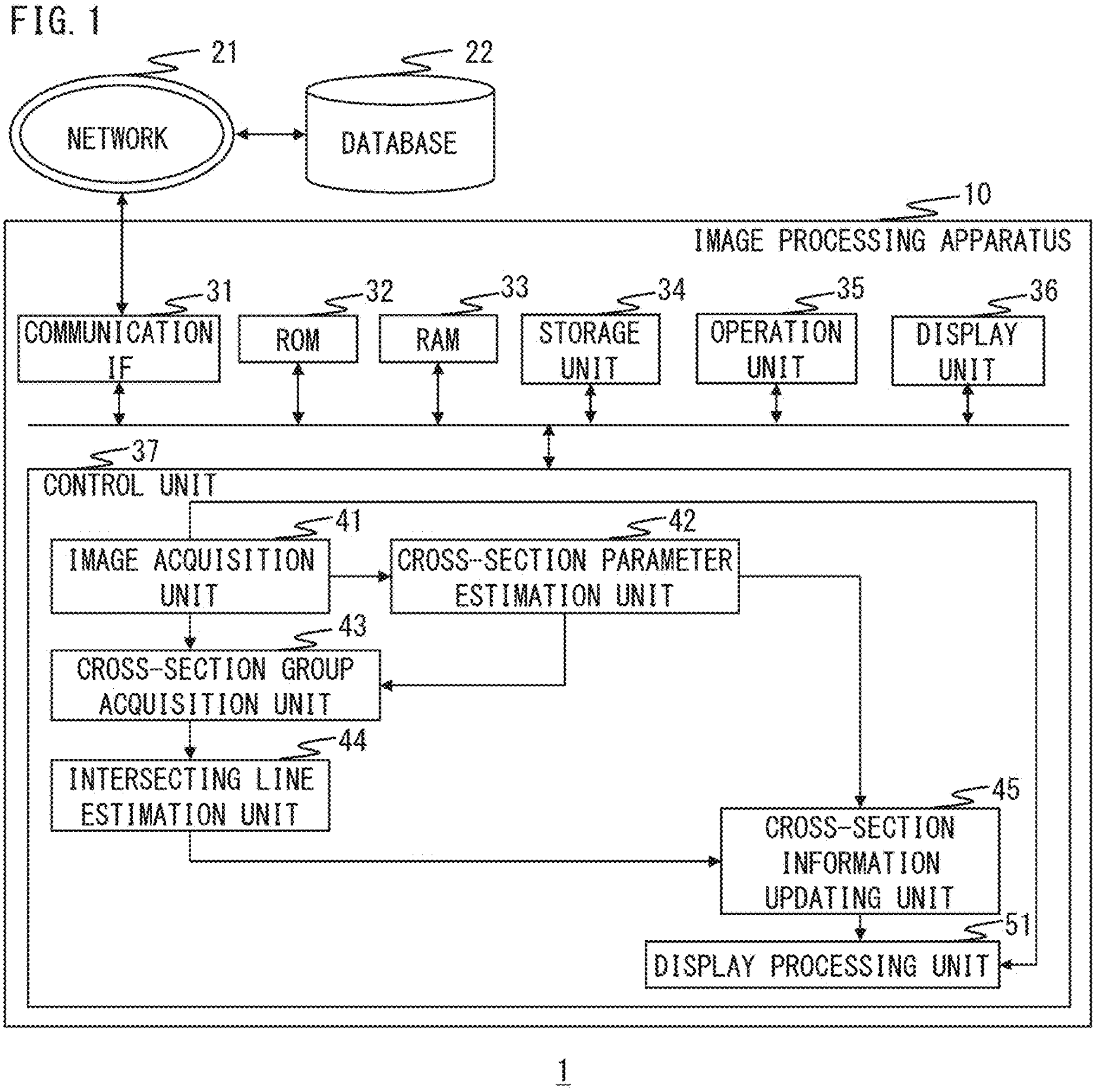
FIG. 1 is a diagram showing the schematic configuration of an image processing apparatus according to a first embodiment.

Hereinafter, embodiments of the present disclosure will be described with reference to the drawings. Note that the present disclosure is not limited to the following embodiments and may appropriately be modified without departing from its gist. Further, in the drawings that will be described below, configurations with the same functions are denoted by the same symbols, and their descriptions will be omitted or simplified as necessary.

Information processing apparatuses according to the embodiments that will be described below provide a function to estimate a prescribed reference cross-section used by doctors or the like to observe (diagnose) input three-dimensional images. The input images to be processed are medical images, that is, images containing subjects (such as human bodies) as objects to be imaged, the subjects being photographed or generated for purposes such as medical diagnoses, examinations, and research. Typically, the input images are those acquired by imaging systems referred to as modalities. Examples of the input images include ultrasound images acquired by ultrasound diagnostic devices. Further, the input images may also be X-ray computed tomography (CT) images acquired by X-ray CT devices, magnetic resonance imaging (MRI) images acquired by MRI devices, or the like.

The following description will provide cases where the reference cross-section of a right ventricular region to be observed is estimated using a transthoracic three-dimensional ultrasound image acquired by imaging the right ventricular region of the heart as an input image.

First Embodiment

An image processing apparatus according to a first embodiment estimates parameters (reference cross-section parameters) that represent the position and posture of a reference cross-section used to observe and analyze the right ventricle, using a three-dimensional image as an input image. At this time, the image processing apparatus first estimates (that is, "roughly estimates") the reference cross-section parameters on the basis of an image acquired by reducing the resolution of the input three-dimensional image, and then calculates a roughly estimated reference cross-section (reference cross-section before updating). Next, the image processing apparatus acquires a plurality of cross sections (an intersecting cross-section group) that intersect with the reference cross-section before updating. Then, at each intersecting cross-section of the intersecting cross-section group, the image processing apparatus estimates an "intersecting line" that represents a position where a reference cross-section after updating (that is, the final reference cross-section) intersects. Finally, the image processing apparatus calculates the parameters of the reference cross-section after updating, using information on each intersecting line thus estimated.

Figure 3A:
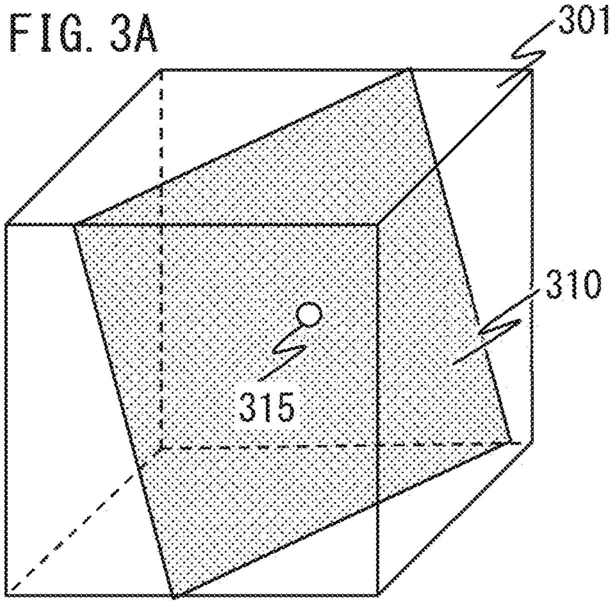
FIGS. 3A and 3B are diagrams schematically showing the mode of a reference cross-section in the first embodiment.
Figure 3B:
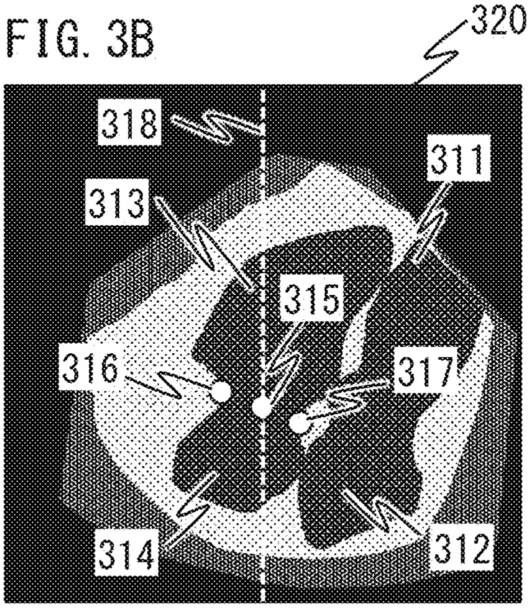

FIG. 3A shows the definition of a reference cross-section in this embodiment. A reference cross-section 310 is a cross section within the space of an input three-dimensional image 301 that is defined on the basis of the anatomical structure of a subject. Further, a reference cross-section image 320 shown in FIG. 3B is a two-dimensional cross-section image obtained by extracting the reference cross-section from the input three-dimensional image 301. Hereinafter, the parameters of the reference cross-section will simply be referred to as a "reference cross-section" where necessary. As shown in FIG. 3B, the reference cross-section in this embodiment is an apical four-chamber image from which the four chambers of a left ventricle 311, a left atrium 312, a right ventricle 313, and a right atrium 314 are capable of being observed simultaneously. In addition to or instead of this, the reference cross-section may also be a right ventricular short-axis image related to the right ventricle 313. Further, a central position 315 is the midpoint between two points 316 and 317 (hereinafter may be referred to as the "left-and-right-tricuspid-annulus midpoint") that represent annulus positions drawn on the reference cross-section 310 when the tricuspid annulus is cut at the reference cross-section 310.

Moreover, the vertical direction (indicated by a dashed line 318) of the reference cross-section corresponds to the direction in which a probe position and the maximum depth position of an ultrasound signal are connected. Here, the central position of the reference cross-section is represented by the three-dimensional coordinate values (cx, cy, cz) in the image coordinate system of the input three-dimensional image. Further, the posture of the reference cross-section is represented by rotational angles ($\alpha$, $\beta$, $\gamma$) about each coordinate axis in the image coordinate system of the input three-dimensional image. That is, the position and posture of the reference cross-section are represented by totally six parameters.

Note that the representation of the posture by rotational angles about each coordinate axis in the image coordinate system of the input three-dimensional image described above is mutually convertible with the representation of the posture by three unit vectors (a normal vector, a cross-section horizontal vector, and a cross-section vertical vector) that are orthogonal to each other. For the convenience of explanation, notation will use a normal vector (nx, ny, nz), a horizontal vector (sx, sy, sz), and a vertical vector (lx, ly, lz). Note that the posture may be represented by values obtained using any method other than rotational angles about each coordinate axis described above. For example, the posture may be represented using a quaternion or by a combination of a rotational axis vector and a rotational angle about an axis. Further, the reference cross-section (reference cross-section before updating) that is calculated prior to an intersecting cross-section group differs from the reference cross-section (reference cross-section after updating) that is finally calculated on the basis of intersecting cross-sections.

Figure 4A:
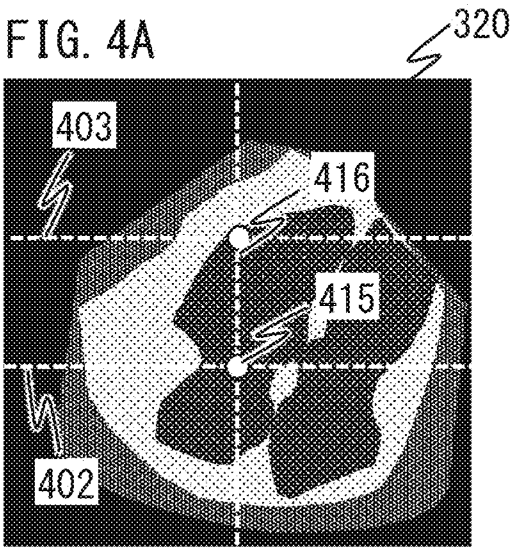
FIGS. 4A to 4C are diagrams schematically showing the mode of intersecting cross-sections in the first embodiment.
Figure 4B:
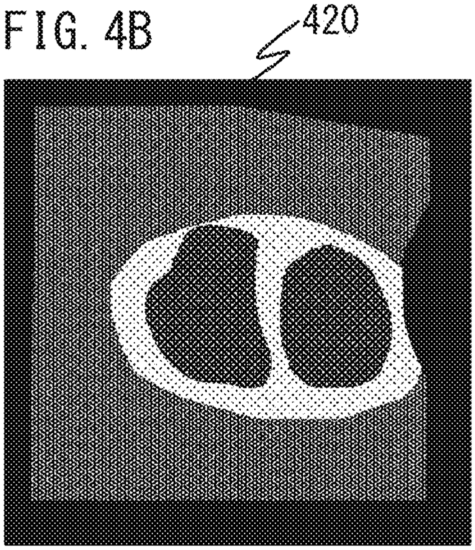
Figure 4C:
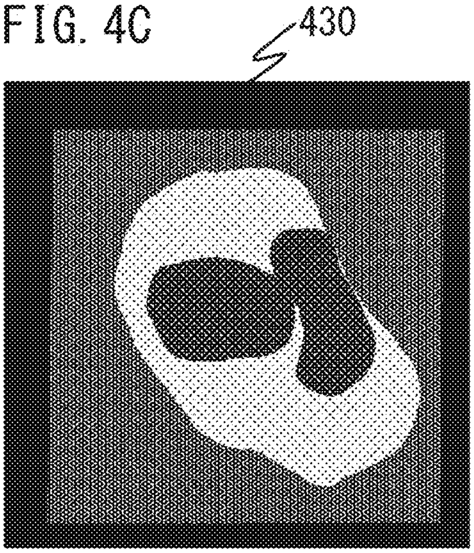

FIGS. 4A to 4C schematically show an intersecting cross-section group and an intersecting cross-section image group in this embodiment. The intersecting cross-section group refers to a plurality of cross sections that intersect with a reference cross-section under a prescribed relationship. The intersecting cross-section group according to this embodiment refers to a plurality of cross sections that are orthogonal to a reference cross-section before updating, parallel to the horizontal direction (X-axis direction) of the reference cross-section before updating, and slice through the right and left ventricles. In this example, two intersecting cross-sections 402 and 403 intersect with the reference cross-section image 320 under a positional relationship shown in FIG. 4A. Intersecting cross-section images 420 and 430 are two-dimensional cross-section images obtained by extracting the respective intersecting cross-sections 402 and 403 from the input three-dimensional image 301. FIGS. 4B and 4C show examples of the two intersecting cross-section images. Note that, like the reference cross-section, each intersecting cross-section image is also a two-dimensional image calculated from the parameters (simply referred to as an intersecting cross-section) that represent the intersecting cross-section and from the input three-dimensional image. The intersecting cross-section image 420 shown in FIG. 4B is an image of the intersecting cross-section 402 that passes through a left-and-right-tricuspid-annulus midpoint 415 shown in FIG. 4A. Similarly, the intersecting cross-section image 430 shown in FIG. 4C is an image of the intersecting cross-section 403 that passes through a midpoint 416 between the left-and-right-tricuspid-annulus midpoint 415 and the upper end of the image in FIG. 4A. Note that, like the reference cross-section, the position and posture of each intersecting cross-section are also represented by six parameters.

Figure 5A:
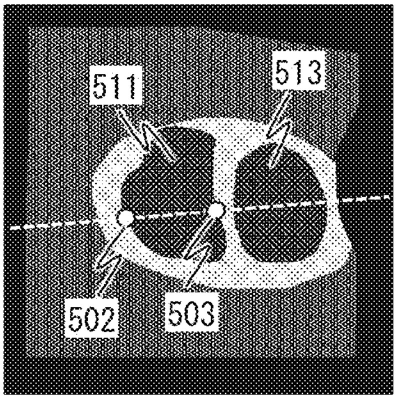
FIGS. 5A to 5D are diagrams showing the updating of reference cross-section parameters using intersecting cross-sections in the first embodiment.
Figure 5B:
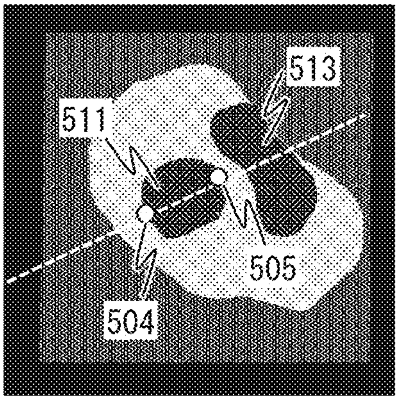
Figure 5C:
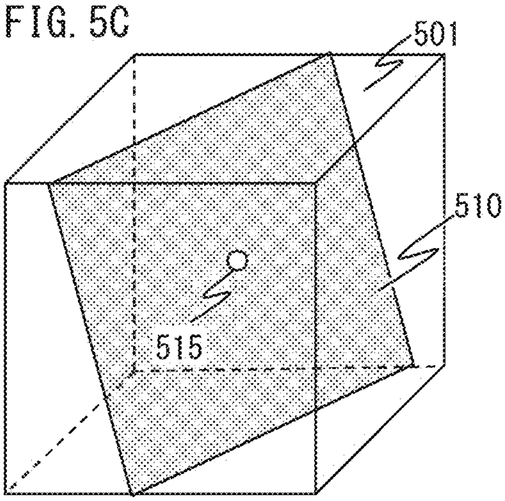
Figure 5D:
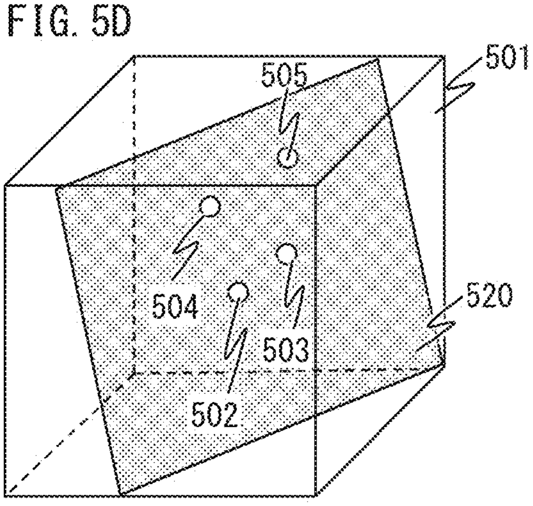

Next, processing to calculate a reference cross-section after updating using a plurality of intersecting cross-sections will be described with reference to FIGS. 5A to 5D. FIGS. 5A and 5B show intersecting cross-sections, which are the same as the cross sections shown FIGS. 4B and 4C, respectively. Further, FIGS. 5C and 5D show a reference cross-section 510 before updating and a reference cross-section 520 after updating, respectively, within the space of an input three-dimensional image 501. The image processing apparatus according to this embodiment estimates the positions of points (points 502 and 503 in FIG. 5A and points 504 and 505 in FIG. 5B) where the intersecting line with the reference cross-section intersects with the contour of the right ventricle, using the images of the plurality of intersecting cross-sections as input. Then, as shown in FIG. 5D, the image processing apparatus calculates the plane that best fits the group of the points thus estimated. The image processing apparatus updates the reference cross-section before updating (the cross section 510 shown in FIG. 5C) using the plane thus calculated to calculate the reference cross-section after updating (the cross section 520 shown in FIG. 5D). The processing will be described in detail in the description of step S205.

Hereinafter, the configurations and processing of the image processing apparatus according to this embodiment will be described. FIG. 1 is a block diagram showing a configuration example of an image processing system (also referred to as a medical image processing system) including the image processing apparatus according to this embodiment. An image processing system 1 includes an image processing apparatus 10 and a database 22. The image processing apparatus 10 is connected to the database 22 to be communicable via a network 21. The network 21 includes, for example, a local area network (LAN) or a wide area network (WAN).

The database 22 retains and manages a plurality of images or information used in the processing that will be described below. The information managed in the database 22 includes information on an input three-dimensional image that is to be subjected to cross-section parameter estimation processing in the image processing apparatus 10. The image processing apparatus 10 is capable of acquiring the data retained in the database 22 via the network 21. Note that when the cross-section parameter estimation processing or endocardial contour estimation processing in the image processing apparatus 10 is performed on the basis of an inference model, information on the inference model is managed in the database 22. Note that the information on the inference model may be stored in an internal storage (a ROM 32 or a storage unit 34) of the image processing apparatus 10 instead of the database 22.

The image processing apparatus 10 includes a communication interface (IF) 31, the read only memory (ROM) 32, a random access memory (RAM) 33, the storage unit 34, an operation unit 35, a display unit 36, and a control unit 37.

The communication IF 31 is a communication unit that is constituted by a LAN card or the like and enables the communication between an external device (for example, the database 22 or the like) and the image processing apparatus 10. The ROM 32 is constituted by a non-volatile memory or the like and stores various programs or various data. The RAM 33 is constituted by a non-volatile memory or the like and used as a work memory that temporarily stores programs or data being executed. The storage unit 34 is constituted by a hard disk drive (HDD) or the like and stores various programs or various data. The operation unit 35 is constituted by a keyboard, a mouse, a touch panel, or the like and inputs instructions from users (for example, doctors or medical technicians) to various devices. The display unit 36 is constituted by a screen or the like and presents various information to users.

The control unit 37 is constituted by a central processing unit (CPU) or the like and comprehensively controls processing in the image processing apparatus 10. The control unit 37 includes an image acquisition unit 41, a cross-section parameter estimation unit 42, an intersecting cross-section group acquisition unit 43, an intersecting line estimation unit 44, a cross-section information updating unit 45, and a display processing unit 51 as its functional configurations. The control unit 37 may also include a graphics processing unit (GPU), a digital signal processor (DSP), a field-programmable gate array (FPGA), or the like.

The image acquisition unit 41 acquires an input three-dimensional image that represents a three-dimensional image of a subject input to the image processing apparatus 10 from the database 22. The processing will be described in detail in the description of step S201. Note that the input three-dimensional image may directly be acquired from a modality. In this case, the image processing apparatus 10 may be mounted in a console for the modality (imaging system).

The cross-section parameter estimation unit 42 estimates parameters for obtaining a reference cross-section from an input three-dimensional image acquired by the image acquisition unit 41. Here, a rough estimation result of the reference cross-section (parameters of the reference cross-section before updating) is obtained. The processing will be described in detail in the description of step S202.

The intersecting cross-section group acquisition unit 43 acquires a two-dimensional cross-section image group (intersecting cross-section image group) that represents a plurality of cross sections (an intersecting cross-section group) intersecting with a reference cross-section, on the basis of an input three-dimensional image acquired by the image acquisition unit 41 and the parameters of the reference cross-section before updating estimated by the cross-section parameter estimation unit 42. The processing will be described in detail in the description of step S203.

The intersecting line estimation unit 44 is an intersecting cross-section acquisition unit that acquires information on an intersecting cross-section intersecting with a prescribed reference cross-section from a three-dimensional image. The intersecting line estimation unit 44 estimates information (intersecting line information) on an intersecting line with respect to each intersecting cross-section of a reference cross-section, using each intersecting cross-section of an intersecting cross-section image group acquired by the intersecting cross-section group acquisition unit 43. The processing will be described in detail in the description of step S204.

The cross-section information updating unit 45 is a cross-section information acquisition unit that acquires reference cross-section information as information on a reference cross-section on the basis of intersecting line information. The cross-section information updating unit 45 calculates reference cross-section parameters after updating, using at least intersecting line information estimated by the intersecting line estimation unit 44. The processing will be described in detail in the description of step S205.

The display processing unit 51 displays information, such as an input three-dimensional image and reference cross-section parameters that have been processed by the image processing apparatus 10, on the image display region of the display unit 36 in a display mode that enables users of the image processing apparatus 10 to easily visually recognize the information. The processing will be described in detail in the description of step S206.

Each constituting element of the image processing apparatus 10 described above functions according to a computer program. For example, the functions of each constituting element are realized when the control unit 37 (CPU) reads and executes a computer program stored in the ROM 32, the storage unit 34, or the like, using the RAM 33 as a work area. Note that some or all of the functions of the constituting elements of the image processing apparatus 10 may be realized using a dedicated circuit. Further, some of the functions of the constituting elements of the control unit 37 may be realized using a cloud computing technology. For example, a computation device located in a different position from the image processing apparatus 10 may be connected to the image processing apparatus 10 to be communicable via the network 21. Then, the functions of the constituting elements of the image processing apparatus 10 or the control unit 37 may be realized when the image processing apparatus 10 performs data transmission and reception with the computation device.

Figure 2:
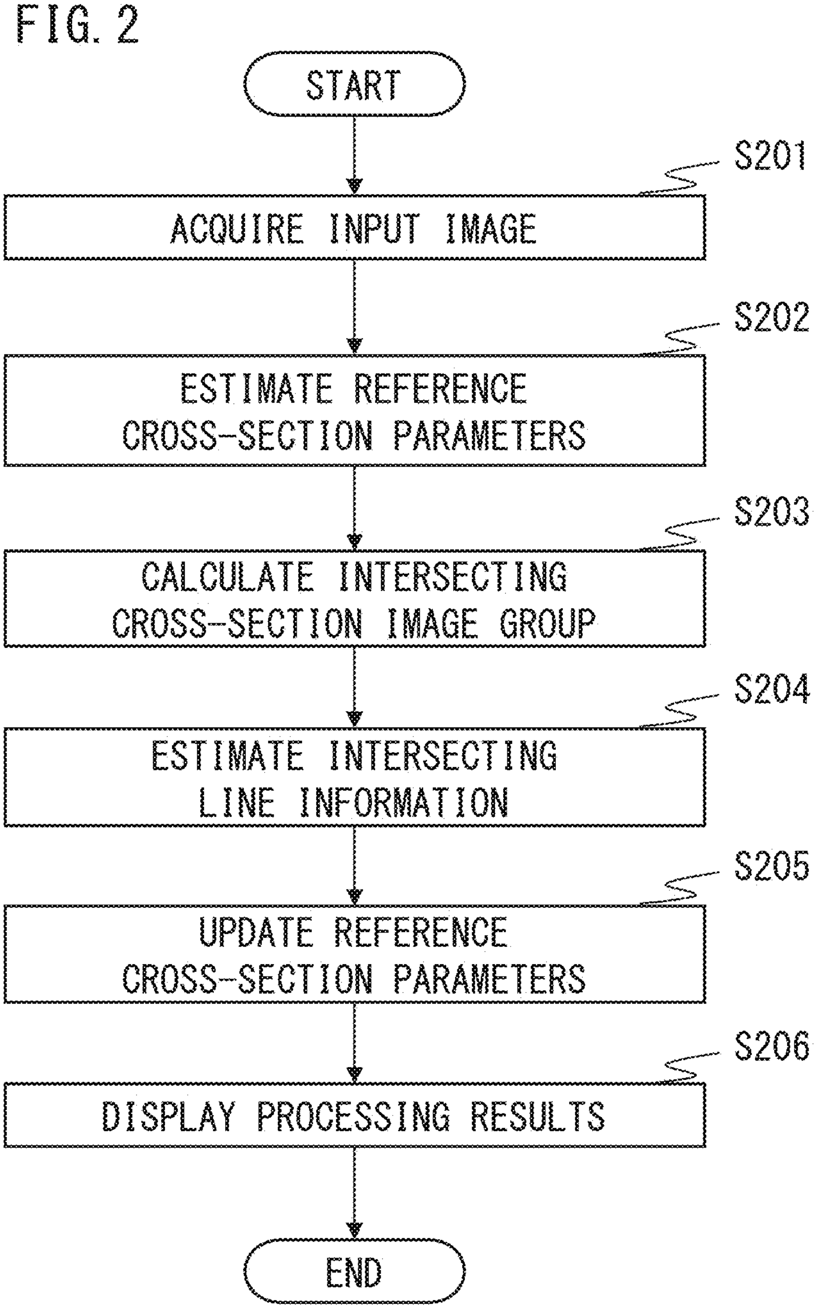
FIG. 2 is a flowchart of the processing performed by the image processing apparatus according to the first embodiment.

Next, an example of the processing performed by the image processing apparatus 10 shown in FIG. 1 will be described with reference to the flowchart shown in FIG. 2.

(Step S201: Acquisition of Input Image) In step S201, the image processing apparatus 10 receives instructions for image acquisition from a user via the operation unit 35. Then, the image acquisition unit 41 acquires an input three-dimensional image specified by the user from the database 22 and then stores the acquired image in the RAM 33. Note that the image acquisition unit 41 may acquire an input image from among ultrasound images captured over time by an ultrasound diagnostic device, other than acquiring the input three-dimensional image from the database 22.

(Step S202: Estimation of Reference Cross-Section Parameters) In step S202, the cross-section parameter estimation unit 42 estimates parameters that define the central position and posture of a reference cross-section before updating, using the input three-dimensional image as input. The cross-section parameter estimation unit 42 is an estimation result acquisition unit that acquires an estimation result of information on the reference cross-section from the three-dimensional image. As described above, the reference cross-section parameters refer to a combination of parameters (three parameters for each, totally six parameters) that represent the position and posture of the reference cross-section in the image coordinate system of the input three-dimensional image.

In this embodiment, a method based on a convolutional neural network (CNN) is used to estimate the reference cross-section parameters. That is, the relationship between the reference cross-section parameters and a three-dimensional ultrasound image obtained by imaging the region of the right ventricle is trained in advance using the CNN. Then, in the processing of this step, the reference cross-section parameters are estimated from the input three-dimensional image using the trained CNN.

Here, the three-dimensional image input to the CNN is not the same as the input three-dimensional image acquired in step S201, but is a “rough” image obtained by reducing the resolution of the input three-dimensional image. For example, it is assumed that the input three-dimensional image is a volume image where the length per voxel is 0.6 mm and represents a range of 256×256×256 voxels, i.e., a range with each side measuring 153.6 mm. In this step, the input three-dimensional image is represented by 64×64×64 voxels, with the length per voxel increased to four times that of the original image. That is, the input three-dimensional image is converted into an image where the length per voxel is 2.4 mm while the representation range with each side measuring 153.6 mm remains unchanged. In this manner, compared to using the input three-dimensional image as it is, it is possible to reduce the calculation time or memory usage for inference using the CNN. Here, known image processing, such as pixel value normalization using the mean and variance of pixel values and contrast correction, may also be applied as preprocessing to the three-dimensional image input to the CNN. Note that the resolution conversion processing described above may use any known method. For example, it is possible to sample voxel values at intervals corresponding to the degree of reduction in resolution or to average the pixel values of voxels within a range corresponding to the degree of reduction in resolution. Further, the image processing such as resolution conversion processing and pixel value normalization described above may be performed in any order or may not be necessarily performed.

Note that in this embodiment, the position and posture of the reference cross-section are represented by six parameters. In this step, the processing is described with an example where the above six values are directly estimated as the output of estimation using the CNN. However, in this embodiment, any form may be used to represent the position and posture as the output of estimation using the CNN. The cross-section parameter estimation unit 42 may be a position and posture acquisition unit that acquires at least one of the position and posture of a subject from a three-dimensional image.

Further, in the processing of this step, instead of performing estimation by the image processing apparatus 10 on the basis of the input three-dimensional image, the control unit 37 may acquire settings performed by a user via the operation unit 35 and use these acquired settings as the reference cross-section parameters before updating.

(Step S203: Calculation of Intersecting Cross-Section Image Group) In step S203, the intersecting cross-section group acquisition unit 43 calculates the parameters of a plurality of intersecting cross-sections (an intersecting cross-section group) intersecting with the reference cross-section before updating, using the input three-dimensional image and the reference cross-section parameters before updating estimated in step S202. Then, on the basis of the calculated parameters of the plurality of intersecting cross-sections, the intersecting cross-section group acquisition unit 43 calculates an intersecting cross-section image group obtained by extracting the region of each intersecting cross-section from the input three-dimensional image. Here, the position and posture of each intersecting cross-section are defined relative to the reference cross-section before updating. That is, the parameters of each intersecting cross-section are uniquely calculable from the parameters of the reference cross-section before updating.

A method for calculating the parameters of an intersecting cross-section group will be described with reference to FIGS. 4A to 4C. Note that in the description of FIGS. 4A to 4C, two intersecting cross-sections, i.e., a first intersecting cross-section and a second intersecting cross-section are used as an intersecting cross-section group. Further, in this embodiment, the intersecting cross-sections are parallel to each other (that is, their postures are the same), and only their central positions differ from each other. First, the parameters of the postures that are the same between all the intersecting cross-sections are calculated. The parameters are calculated on the basis of the posture parameters of the reference cross-section before updating calculated in step S202. Specifically, the normal direction of the intersecting cross-sections corresponds to the vertical direction of the reference cross-section before updating, while the vertical direction of the intersecting cross-sections corresponds to the normal direction of the reference cross-section before updating. Then, the horizontal direction of the intersecting cross-sections corresponds to the horizontal direction of the reference cross-section before updating. That is, each intersecting cross-section is orthogonal to the reference cross-section before updating.

Next, the central position of each intersecting cross-section is calculated. Among the intersecting cross-section group constituted by the plurality of intersecting cross-sections, the central position of the first intersecting cross-section is the same as that of the reference cross-section before updating. That is, the central position of the first intersecting cross-section is the same as the left-and-right-tricuspid-annulus midpoint 415. The central position of the second intersecting cross-section is the position obtained by moving the central position of the first intersecting cross-section parallel to the normal direction of the intersecting cross-section. The central position of the second intersecting cross-section is the midpoint 416 between the central position of the first intersecting cross-section and the position at the upper end of the reference cross-section before updating that is extended in the normal direction from the central position of the first intersecting cross-section.

After the parameters of all the intersecting cross-sections are calculated as described above, a two-dimensional cross-section image of each intersecting cross-section is extracted from the input three-dimensional image. The two-dimensional cross-section images are calculated by sampling the input three-dimensional image using the central positions calculated in this step, horizontal vectors, and vertical vectors. Here, the length per pixel is the same (for example, 0.6 mm) as in the input three-dimensional image, and a range of 256×256 pixels (153.6 mm×153.6 mm when the length per pixel is 0.6 mm) is sampled. Then, the acquired two-dimensional cross-section images are stored in the RAM 33. Here, if the sampling range exceeds beyond the defined range of the input three-dimensional image, a pixel value of "O" is inserted at positions outside the defined range of the input three-dimensional image.

Note that this embodiment describes an example where the two intersecting cross-sections are used. However, for example, at least three intersecting cross-sections obtained by equally dividing the region between a first intersecting cross-section and a second intersecting cross-section by a prescribed number may be used. In this case, the third or subsequent intersecting cross-sections are surfaces parallel to the first intersecting cross-section and the second intersecting cross-section.

(Step S204: Estimation of Intersecting Line Information)

In step S204, the intersecting line estimation unit 44 estimates information that represents an intersecting line with the reference cross-section in each intersecting cross-section image, using the intersecting cross-section image group acquired in step S203. In this embodiment, the intersecting line refers to a line that passes through the vicinity of the centers of both the right ventricle 511 and the left ventricle 513. As shown in FIGS. 5A and 5B, in this embodiment, the information that represents the intersecting line is represented by intersecting points (that is, two points per intersecting cross-section image) when the intersecting line intersects with the contour of the region of the right ventricle. In step S204, the intersecting line estimation unit 44 is an intersecting line information acquisition unit that, on the basis of information on a plurality of intersecting cross-sections, acquires intersecting line information that represents information on the intersecting lines between the plurality of intersecting cross-sections and a reference cross-section.

In this embodiment, a CNN is used to estimate the intersecting points. That is, a multiplicity of the combinations of three-dimensional images and information on reference cross-sections set by doctors or the like are collected, and intersecting cross-section images and the positions of the intersecting points in the intersecting cross-sections are calculated in advance. Then, the CNN that has trained the relationships between the intersecting cross-section images and the positions of the intersecting points is constructed using the collected information. In the processing of this step, the coordinates of the intersecting points are estimated from the intersecting cross-section images using the trained CNN. The CNN is designed to perform learning and estimation for each of the plurality of intersecting cross-section images. That is, when there are two intersecting cross-section images, a CNN is each constructed to infer each intersecting cross-section image, and intersecting points are inferred from each intersecting cross-section image using the corresponding CNN.

In this manner, the information (the points 502 and 503 shown in FIG. 5A and the points 504 and 505 shown in FIG. 5B) that represents the intersecting line with the reference cross-section in each intersecting cross-section image is estimated through inference processing based on the three-dimensional image.

Note that this embodiment describes an example where the CNN is trained and used for inference for each intersecting cross-section. However, a single CNN may perform learning and inference for all the intersecting cross-section images. In this case, it becomes possible to reduce the data storage capacity occupied by the CNNs.

(Step S205: Updating of Reference Cross-Section Parameters) In step S205, the cross-section information updating unit 45 updates the reference cross-section parameters on the basis of the intersecting line information estimated in step S204.

Processing to update cross-section information will be described with reference to FIGS. 5A to 5D. The points 502, 503, 504, and 505 shown in FIGS. 5A and 5B are intersecting points, with two intersecting points estimated for each intersecting cross-section in step S204. In this step, a known method, i.e., the least squares method is used to calculate an approximate plane that passes through these points. As a result, the posture component of the updated reference cross-section is determined. Note that, as before updating, the vertical direction of the updated reference cross-section is a direction corresponding to the direction in which a probe position and the maximum depth position of an ultrasound signal are connected. Here, the two points 502 and 503 estimated on the first intersecting cross-section (FIG. 5A) are points on the annulus. Therefore, on the basis of the definition of the central position of the cross section shown in FIG. 3B, the central position of the updated reference cross-section is the midpoint between the points 502 and 503. In this manner, the updated reference cross-section is calculated as shown by the cross section 520 in FIG. 5D. Further, the approximate plane may be calculated under the condition that the left-and-right-tricuspid-annulus midpoint of the reference cross-section before updating is included (that is, the central position of the reference cross-section before updating remains unchanged). Note that this embodiment describes an example where there are the two intersecting cross-sections. However, even where there are at least three intersecting cross-sections, it is also possible to update reference cross-section parameters using the same method.

Note that it is also possible to update the reference cross-section parameters on the basis of both the reference cross-section parameters before updating estimated in step S202 and the intersecting line information estimated in step S204. In this case, the central position of the reference cross-section parameters before updating is maintained, and only normal vectors are updated. First, the "normal vector of each intersecting cross-section" is calculated from the intersecting line information estimated in step S204. Specifically, the normal vectors include the vector of an axis within the intersecting cross-section that is perpendicular to the line connecting the points 502 and 503 in FIG. 5A, and the vector of an axis within the intersecting cross-section that is perpendicular to the line connecting the points 504 and 505 in FIG. 5B.

Next, an average normal vector is calculated from these normal vectors. If the normal vectors calculated for the plurality of intersecting cross-sections are close to each other, the normal vectors may simply be averaged. Alternatively, averaging may be performed after excluding normal vectors with at least a certain angular difference (for example, at least 10 degrees) relative to the normal vector of the reference cross-section before updating as outliers. The vector calculated as described above is replaced with the normal vector of the reference cross-section before updating to update the reference cross-section parameters. Further, the vertical direction within the plane is set to be the same as that of the reference cross-section before updating. In this manner, the central position remains unchanged from the reference cross-section before updating, making it possible to prevent significant deviation from the reference cross-section before updating.

(Step S206: Display of Processing Results) In step S206, the display processing unit 51 displays information on processing results from the image processing apparatus 10 within the image display region of the display unit 36 in a display mode that enables the user to easily visually recognize the information. The displayed information includes at least a reference cross-section image extracted using the reference cross-section parameters updated in step S205. At this time, the displayed information may also include information calculated from the reference cross-section, such as an orthogonal cross-section image that is orthogonal to the reference cross-section.

Note that the display processing in step S206 is not essential when analysis or measurement based on the reference cross-section is targeted. Alternatively, it may be possible to store the cross-section parameters obtained in step S205 in a storage device or output the same to the outside as an alternative configuration. Further, if an analysis unit (not shown) that performs analysis or measurement using the reference cross-section is included in the image processing apparatus 10, it may be possible to transmit the input three-dimensional image or the information on the reference cross-section parameters to the analysis unit as an alternative configuration.

According to this embodiment, parameters (reference cross-section parameters) that represent the position and posture of a reference cross-section used to observe the right ventricle are estimated using a three-dimensional image as an input image. At this time, the reference cross-section parameters are updated using information on cross sections intersecting with a roughly estimated reference cross-section. As a result, it becomes possible to improve the accuracy of reference cross-section estimation.

In the first embodiment, it is required that each intersecting cross-section be orthogonal to the reference cross-section and that they be parallel to each other as a condition when the plurality of intersecting cross-section images are calculated in step S203. However, this condition may not be necessarily satisfied as long as each intersecting cross-section has a prescribed positional relationship with the reference cross-section before updating and does not intersect with the reference cross-section before updating at the same position. For example, the intersecting cross-sections may intersect with the reference cross-section at angles other than 90 degrees (for example, 80 degrees) or may not be parallel to each other. Further, the positional relationship with the reference cross-section may not be based on certain values but may be adaptively set according to processed three-dimensional images. For example, the normal vectors of the intersecting cross-sections may deviate from being parallel to each other within the range of a prescribed value (for example, ±5 degrees). For example, after measuring the contrast (the difference between the minimum pixel value and the maximum pixel value) between the calculated intersecting cross-section images, the intersecting cross-section images with the maximum contrast may be calculated under the conditions that the intersecting cross-sections do not intersect with each other and that the rotation amounts of the normal vectors fall within a prescribed value (for example, ±5 degrees). In this case, the cross-section images with high contrast, through which the structure of tissues is easily identified, are input in the estimation processing of step S204, making it possible to improve the accuracy of intersecting line estimation.

Further, the intersecting positions with the reference cross-section may not be based on fixed values. For example, the intersecting cross-section images may be acquired using a plurality of candidate values within a position range based on a prescribed positional relationship with the reference cross-section before updating. Then, for example, after measuring the contrast between the intersecting cross-section images in the same manner as the above, the intersecting cross-section images with the maximum contrast within the position range may be calculated. In this case, the cross-section images with high contrast, through which the structure of tissues is easily identified, are also input in the estimation processing of step S204, making it possible to improve the accuracy of intersecting line estimation.

Note that in the first embodiment, the reference cross-section before updating and after updating is represented by the six parameters (three position parameters and three posture parameters). However, the parameters of the reference cross-section may include only one of the position and posture. In this case, the intersecting cross-sections intersecting with the reference cross-section are calculated by combining the reference cross-section parameters and the coordinate system of the input three-dimensional image. For example, when the reference cross-section parameters include only the position, the normal vector of the first intersecting cross-section in step S203 corresponds to the vertical vector of the input three-dimensional image, and the central position thereof corresponds to the central position of the reference cross-section before updating. On the other hand, when the reference cross-section parameters include only the posture, the first intersecting cross-section corresponds to the cross section that is orthogonal to the reference cross-section parameters before updating and that passes through the central point of the input three-dimensional image. In both cases, the second intersecting cross-section is a cross section obtained by parallelly moving the first intersecting cross-section by a prescribed amount (for example, 10 mm) in the normal direction. The processing to estimate the intersecting lines is the same as the processing in step S204 of the first embodiment, and the updating amount of one of the position and posture is calculated from the intersecting line information. In this manner, it is possible to independently estimate the position and posture of the reference cross-section. Therefore, it is possible to flexibly handle, for example, a case where a user manually inputs information on one of the position and posture.

Further, in the first embodiment, the intersecting points (two points per intersecting cross-section) where the intersecting line intersects with the contour of the right ventricle are estimated as the intersecting line information estimated in step S204. However, the intersecting line information estimated in step S204 is not limited to this. For example, it may include a two-dimensional vector that represents the "direction" of an intersecting line on the intersecting cross-section, or information that represents a "line," that is, a combination of the two-dimensional vector and coordinate values that represent a position on the line. In this case, the method for updating the cross-section information in step S205 is also changed. For example, the reference cross-section parameters after updating are calculated by iterative optimization. In this case, the reference cross-section parameters (six parameters) are used as variables that are to be adjusted for optimization. In each step of the iterative optimization, an intersecting line is first calculated on the basis of the geometrical relationship between the cross section represented by the reference cross-section parameters and each intersecting cross-section. These intersecting lines are represented as two-dimensional vectors on the intersecting cross-sections. Then, the angular difference between each two-dimensional vector and the intersecting line vector estimated in step S204 is calculated. The cost for the iterative optimization is the sum of the angular differences calculated in this manner. As a result, the need to precisely estimate the intersecting points where the intersecting line intersects with the region of the right ventricle is eliminated, making it possible to reduce risks such as failure to estimate the end point due to noise or the like in the intersecting cross-section image.

In the first embodiment, the horizontal direction of the intersecting cross-sections corresponds to the horizontal direction of the reference cross-section before updating when the intersecting cross-section images are calculated in step S203. However, the horizontal direction of the intersecting cross-sections may be determined independently of the reference cross-section before updating. In this case, the horizontal direction of the intersecting cross-sections is set to correspond to the horizontal direction (X-axis direction) of the input three-dimensional image. As a result, the intersecting cross-sections are not affected by the estimation accuracy of in-plane components in the reference cross-section before updating, enabling a stable operation.

Modified Example 1 of First Embodiment

Hereinafter, a modified example of the above first embodiment will be described. The first embodiment describes an example where the three-dimensional ultrasound image obtained by imaging the region of the right ventricle of the heart is an object to be processed. However, the technology of the present disclosure is also applicable even when images obtained by imaging regions of the heart other than the right ventricle or organs other than the heart or images obtained using other modalities are used.

An example of applying the present invention to images of regions other than the region of the right ventricle of the heart that are obtained using modalities other than ultrasound devices includes generating deployment images by opening tubular regions such as aortas from three-dimensional X-ray CT images. In this case, the cutting surfaces that open the tubular regions correspond to reference cross-sections, and the cutting surfaces where the tubular regions are sliced correspond to intersecting cross-sections. Here, the central position of each intersecting cross-section may correspond to the centroid position of the contour of the tubular region. Further, the estimated intersecting line may have one endpoint that represents the centroid position and the other endpoint where the cutting surface that opens the tubular region intersects with the contour of the tubular region.

As described above, according to this modified example, it is possible to apply the technology of the present disclosure to images from modalities other than three-dimensional ultrasound images or targets other than the region of the right ventricle of the heart.

Modified Example 2 of First Embodiment

Next, another modified example of the first embodiment will be described. In the first embodiment, the CNN is used as an estimation algorithm to perform the estimation in step S202 or step S204. However, the technology of the present disclosure is also applicable even when another estimation algorithm is used.

As estimation algorithms other than the CNN, for example, methods based on PCA used in the above related arts or deep learning methods such as vision transformers may be used. Further, machine learning methods not based on deep learning, such as regression using support vector machines, may also be used. Further, different estimation algorithms may also be used in the processing of steps S202 and S204. As described above, according to this modified example, it is possible to perform the processing using various methods other than the CNN.

Second Embodiment

Next, a second embodiment will be described. Like the first embodiment, an image processing apparatus according to the second embodiment estimates parameters (reference cross-section parameters) that represent the position and posture of a reference cross-section used to observe the right ventricle, using a three-dimensional image as an input image. In the first embodiment, all the plurality of intersecting cross-sections defined to correct the reference cross-section are parallel to the horizontal direction (X-axis direction) of the reference cross-section before updating. That is, the first embodiment does not necessarily adapt to variations in the posture of the right ventricle relative to the reference cross-section before updating. In this embodiment, an intersecting cross-section group is set using the vector of a "central axis" estimated on the basis of the posture of the right ventricle on a reference cross-section before updating. In this manner, it becomes possible to calculate an intersecting cross-section group on the basis of the anatomical structure of the right ventricle.

Figure 7A:
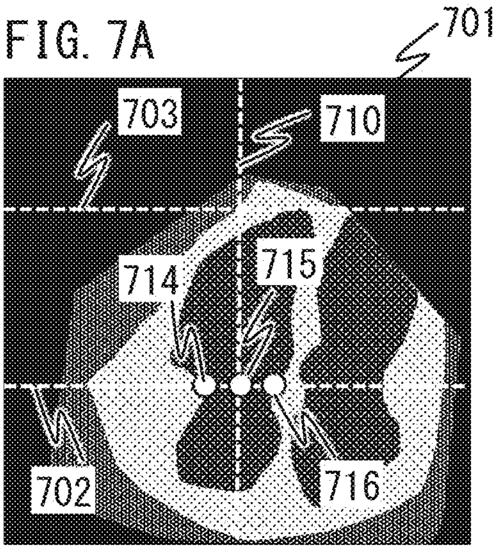
FIGS. 7A to 7C are diagrams schematically showing the mode of intersecting cross-sections according to the second embodiment.
Figure 7B:
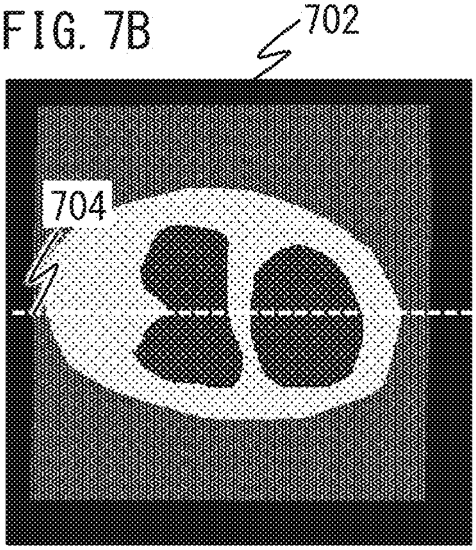
Figure 7C:
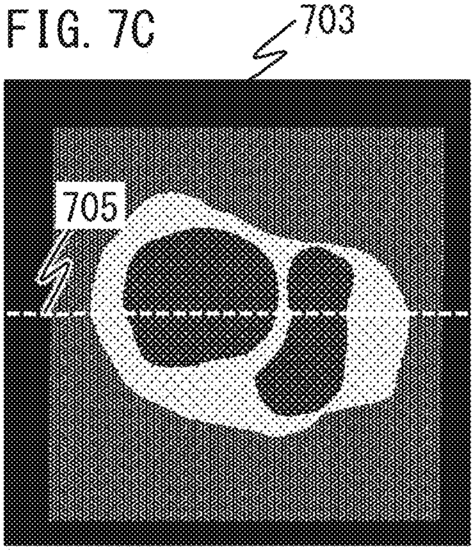

FIGS. 7A to 7C schematically show a reference cross-section, a central axis, and a plurality of intersecting cross-sections calculated on the basis of the central axis in this embodiment. In FIG. 7A, points 714 and 716 are positions where the tricuspid annulus intersects with a reference cross-section 701, and a point 715 is the midpoint between the two points (the left-and-right-tricuspid-annulus midpoint). In this embodiment, a central-axis vector 710 is the vector of an axis on the reference cross-section 701, which passes through the left-and-right-tricuspid-annulus midpoint 715 and is orthogonal to an axis connecting the points 714 and 716. The central axis thus set is also referred to as a "right ventricle inflow path" and is an axis that defines the posture of the right ventricle. In this embodiment, the vertical direction of the reference cross-section corresponds to the central axis.

In FIG. 7A, surfaces 702 and 703 indicated by dashed lines are examples of intersecting cross-sections in this embodiment and are cross sections orthogonal to both the reference cross-section 701 and the central-axis vector 710. By setting intersecting cross-sections on the basis of this axis, intersecting cross-section images (FIGS. 7B and 7C) become sliced images that reflect the posture of the right ventricle in an input three-dimensional image. As a result, the variability of images drawn on the intersecting cross-sections is reduced between cases. Therefore, inference processing to calculate intersecting lines from the cross sections is facilitated, enabling more appropriate correction of reference cross-section parameters.

The configurations and processing of the image processing apparatus according to this embodiment will be described. The configurations of the image processing apparatus according to this embodiment are the same as those (FIG. 1) of the image processing apparatus according to the first embodiment. Further, the processing performed by an image acquisition unit 41, an intersecting line estimation unit 44, and a display processing unit 51 is the same as that performed in the first embodiment. Note that in this embodiment, the same configurations and processing as those in the first embodiment will be denoted by the same symbols, and their detailed descriptions will be omitted.

Like the first embodiment, a cross-section parameter estimation unit 42 estimates parameters for obtaining a reference cross-section before updating from an input three-dimensional image acquired by the image acquisition unit 41. In this embodiment, the cross-section parameter estimation unit 42 also estimates a central axis vector used to define the posture of the right ventricle on the reference cross-section before updating. The processing will be described in detail in the description of step S603.

An intersecting cross-section group acquisition unit 43 acquires two-dimensional cross-section images that represent a plurality of cross sections (intersecting cross-sections) intersecting with a reference cross-section, on the basis of an input three-dimensional image acquired by the image acquisition unit 41, the parameters of the reference cross-section before updating that is estimated by the cross-section parameter estimation unit 42, and a central axis vector. The processing will be described in detail in the description of step S604.

A cross-section information updating unit 45 calculates reference cross-section parameters after updating, using initial reference cross-section parameters and a central axis vector that are estimated by the cross-section parameter estimation unit 42, along with intersecting line information that is estimated by the intersecting line estimation unit 44. The processing will be described in detail in the description of step S606.

Figure 6:
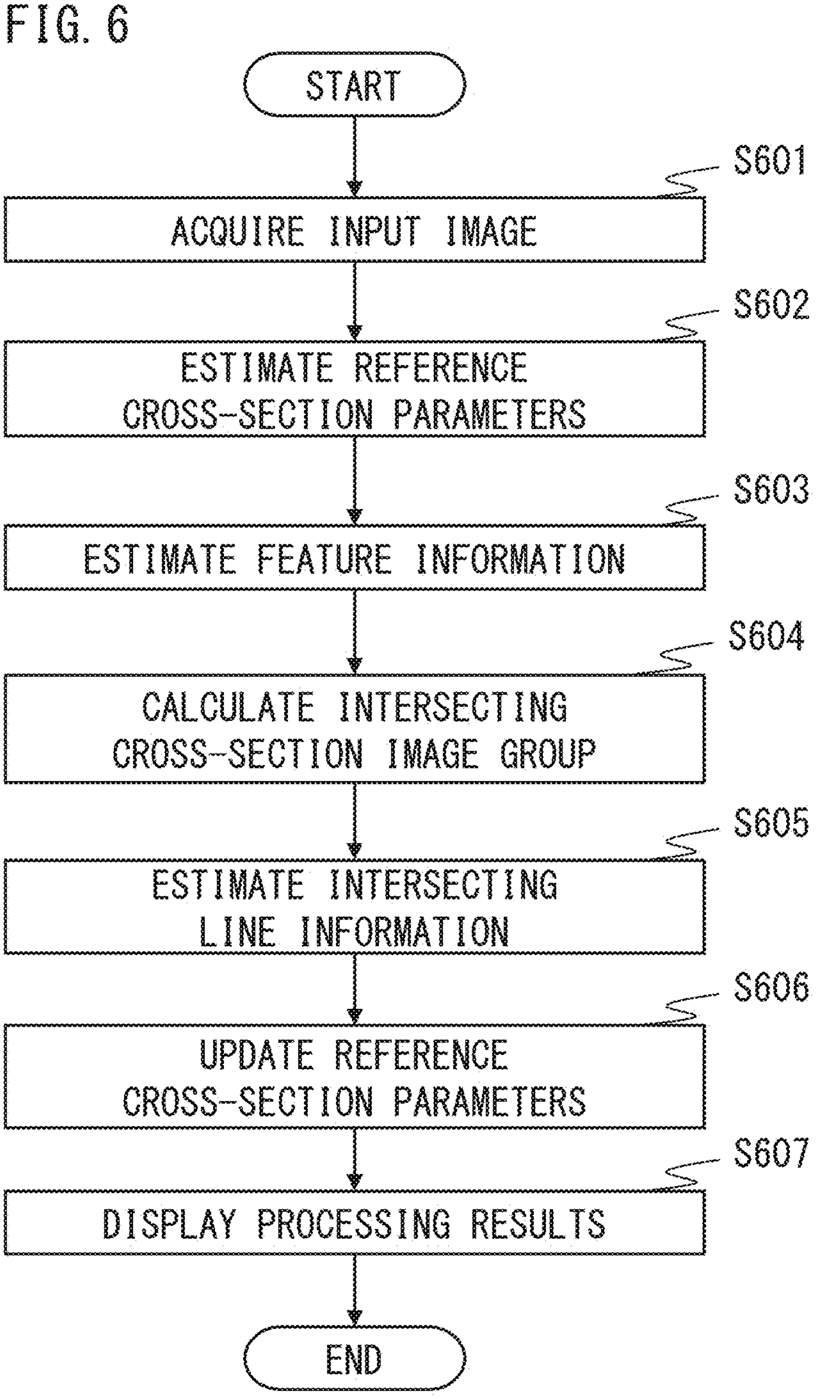
FIG. 6 is a flowchart of the processing performed by an image processing apparatus according to a second embodiment.

Next, an example of the processing performed by the image processing apparatus 10 shown in FIG. 1 according to this embodiment will be described with reference to a flowchart shown in FIG. 6. Here, the processing of steps S601, S602, S605, and S607 is the same as that of steps S201, S202, S204, and S206 in the flowchart (FIG. 2) of the first embodiment, respectively. Hereinafter, only the processing steps differing from those of the first embodiment will be described.

(Step S603: Estimation of Feature Information) In step S603, the cross-section parameter estimation unit 42 estimates feature information for calculating an intersecting cross-section image group in step S604, on the basis of a reference cross-section before updating that is estimated in step S602. In this embodiment, the feature information refers to a central axis vector used to define the posture of the right ventricle. In step S603, the cross-section parameter estimation unit 42 is a central axis acquisition unit that acquires information on a central axis that represents the direction of a subject in a three-dimensional image. As shown in FIG. 7A, the central axis vector according to this embodiment is defined as the axis that passes through the left-and-right-tricuspid-annulus midpoint 715 and is orthogonal to the axis connecting the tricuspid annulus points 714 and 716.

A method for estimating a central axis vector in this step will be specifically described. First, a cross-section image of a reference cross-section before updating is calculated on the basis of the parameters of (totally six parameters of the central position and posture) of the reference cross-section before updating that are estimated in step S602. This processing is the same as the processing to extract the two-dimensional cross-section images from the input three-dimensional image in step S203 of the first embodiment. Next, the coordinate positions of tricuspid annulus points (two points) are estimated using the two-dimensional cross-section image thus obtained as input. The estimation is performed using a CNN. Finally, using the two estimated tricuspid annulus points, a central axis vector is calculated on the basis of the above definition.

Note that when estimating the coordinate positions of the two tricuspid annulus points, it is also possible to estimate not only the coordinates of the two points but also the contour of the right ventricle, and then estimate the coordinate positions of the tricuspid annulus points on the basis of the coordinates and the contour. Specifically, a group of a plurality of points forming the contour of the right ventricle are simultaneously estimated, and two points at both ends among the group of the plurality of points are extracted to calculate the coordinates of the two desired points. For example, a CNN is used as a model trained in advance to perform the estimation. Since the estimation of the two tricuspid annulus points based on the overall contour of the right ventricle is performed using a continuous shape, stable calculation is achieved. Specifically, when a CNN is used, the relative positional relationship between neighboring points may be used in designing a loss function during training, enabling more accurate estimation.

(Step S604: Calculation of Intersecting Cross-Section Image Group) In step S604, the intersecting cross-section group acquisition unit 43 acquires an intersecting cross-section image group obtained by cutting the input three-dimensional image at a plurality of cross sections (an intersecting cross-section group) intersecting with the reference cross-section. The intersecting cross-section image group is calculated on the basis of the input three-dimensional image that is acquired by the image acquisition unit 41, the parameters of the reference cross-section before updating that are estimated by the cross-section parameter estimation unit 42, and the central axis vector. Note that each image of the intersecting cross-section image group is a two-dimensional image.

In step S203 of the first embodiment, the normal vectors of all the intersecting cross-sections correspond to the vertical direction of the reference cross-section before updating. On the other hand, in this embodiment, the normal vectors of the intersecting cross-sections correspond to the central axis vector estimated in step S603. Further, the central position of each intersecting cross-section is defined as a position where the central axis vector passes through each intersecting cross-section. Apart from the above point, the processing content of this step is the same as that of step S203 in the first embodiment.

(Step S606: Updating of Reference Cross-Section Parameters) In step S606, the cross-section information updating unit 45 calculates reference cross-section parameters after updating, using the initial reference cross-section parameters and the central axis vector that are estimated by the cross-section parameter estimation unit 42, along with the intersecting line information that is estimated by the intersecting line estimation unit 44.

Figure 8A:
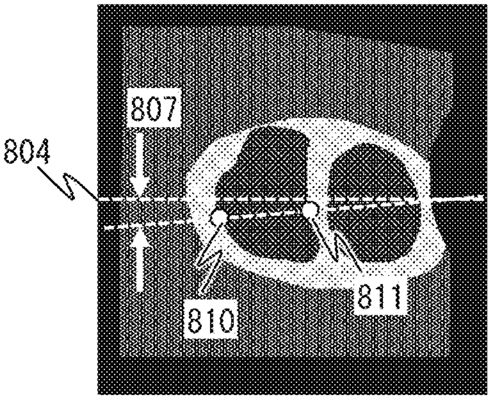
FIGS. 8A to 8D are diagrams showing the updating of reference cross-section parameters using intersecting cross-sections according to the second embodiment.
Figure 8B:
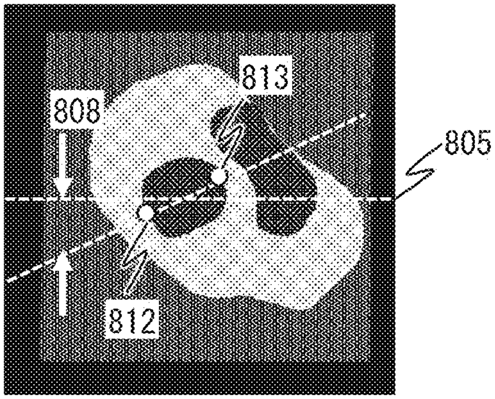
Figure 8C:
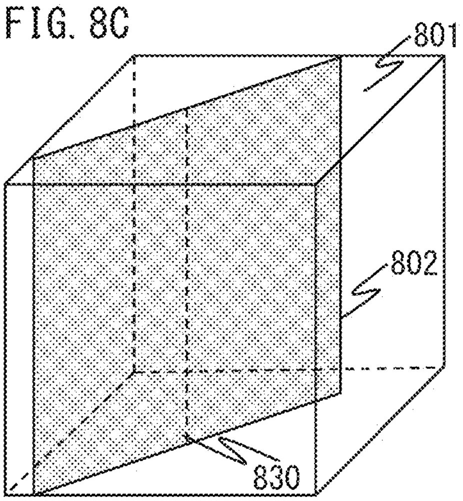
Figure 8D:
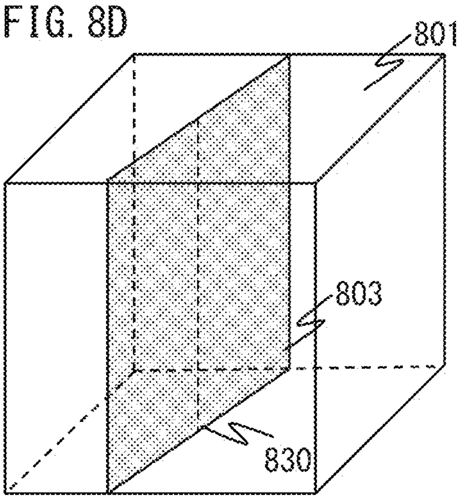

FIGS. 8A to 8D are diagrams schematically showing the processing performed when cross-section information is updated using a central axis vector. FIGS. 8A and 8B show two intersecting cross-sections. In each figure, a horizontal line 804 or 805 represents an intersecting line where a reference cross-section before updating intersects with the intersecting cross-section. Then, by the processing of step S605, the coordinates of points 810, 811, 812, and 813 are estimated in each intersecting cross-section. In this case, first, an angular difference 807 representing an angle formed by a vector connecting the points 810 and 811 and the horizontal line 804, and an angular difference 808 representing an angle formed by a vector connecting the points 812 and 813 and the horizontal line 805 are each calculated. Next, the two calculated angular differences are averaged. This average angular difference thus calculated serves as a "rotation angle" used to update cross-section information. Finally, the reference cross-section before updating is rotated by the rotation angle about a central axis vector. FIG. 8C shows an initial reference cross-section before rotation within the space of an input three-dimensional image 801, and FIG. 8D shows a reference cross-section 803 that has rotated about a central axis vector 830 within the space of the input three-dimensional image 801.

As described above, the reference cross-section parameters are updated in consideration of both the central axis of the right ventricle estimated in step S603 and the intersecting lines estimated on the basis of the intersecting cross-sections.

Note that without performing the processing described in this step, it is also possible to update the cross-section information using a method for calculating an approximate plane that passes through estimated point group coordinates, as in step S205 of the first embodiment.

As described above, according to this embodiment, intersecting cross-sections are calculated using a "central axis" estimated on the basis of a reference cross-section before updating instead of the vertical direction of the reference cross-section before updating. In this manner, images of an intersecting cross-section image group become sliced images that reflect the posture of the right ventricle in an input three-dimensional image. As a result, the variability of images drawn on the intersecting cross-sections is reduced between cases. Therefore, inference processing to calculate intersecting lines from the cross sections is facilitated, enabling more appropriate correction of reference cross-section parameters.

Note that the second embodiment describes an example where the central axis vector is estimated on the basis of the reference cross-section before updating in step S603. However, the present invention is not limited to this, and it is also possible to directly calculate a central axis vector from an input three-dimensional image without a reference cross-section before updating. For example, after detecting a ring-shaped form representing the tricuspid annulus from an input three-dimensional image and then calculating an approximate plane on which the form lies, the normal vector of the plane may be used as a central axis vector. In this case, even if tricuspid annulus points are not satisfactorily estimated in a reference cross-section before updating, it becomes possible to estimate the central axis vector in consideration of the three-dimensional structure of the right ventricle. Further, on the basis of both a central axis calculated by the method described in step S603 of the second embodiment and a central axis calculated in the above processing, it is also possible to calculate a central axis that is to be used in subsequent processing steps. Specifically, it is possible to calculate an average of the two central axes or select one of the two central axes on the basis of the image quality or the like of a reference cross-section before updating.

Further, in the second embodiment, all the intersecting cross-sections are parallel to each other when the plurality of intersecting cross-sections are calculated in step S604. However, the intersecting cross-sections may not necessarily be parallel to each other as long as they do not intersect with the reference cross-section before updating at the same position. That is, the normal vectors of the intersecting cross-sections may deviate from being parallel to each other within the range of a prescribed value (for example, ±5 degrees). For example, after measuring the contrast (the difference between the minimum pixel value and the maximum pixel value) between the calculated intersecting cross-section images, the intersecting cross-section images with the maximum contrast may be calculated under the conditions that the intersecting cross-sections do not intersect with each other and that the rotation amounts of the normal vectors fall within prescribed values (for example, ±5 degrees). In this case, the cross-section images with high contrast, through which the structure of tissues is easily identified, are input in the estimation processing of step S605, making it possible to improve the accuracy of intersecting line estimation.

Third Embodiment

Next, a third embodiment will be described. Note that in this embodiment, the same configurations and processing as those in the first and second embodiments will be denoted by the same symbols, and their detailed descriptions will be omitted. Like the first and second embodiments, an image processing apparatus 10 according to the third embodiment estimates parameters (reference cross-section parameters) that represent the position and posture of a reference cross-section used to observe the right ventricle, using a three-dimensional image as an input image. In the second embodiment, the calculation of the intersecting cross-section group is performed using only the information (the cross-section parameters and the central axis vector) obtained from the reference cross-section before updating. On the other hand, in this embodiment, an intersecting cross-section image group is also calculated using information obtained from another cross section (auxiliary cross-section) derived from a reference cross-section before updating. In this manner, it is possible to incorporate the anatomical characteristics of the right ventricle, such as the crista supraventricularis, which are not reflected in the reference cross-section before updating, into the calculation of the intersecting cross-section image group.

Figure 9A:
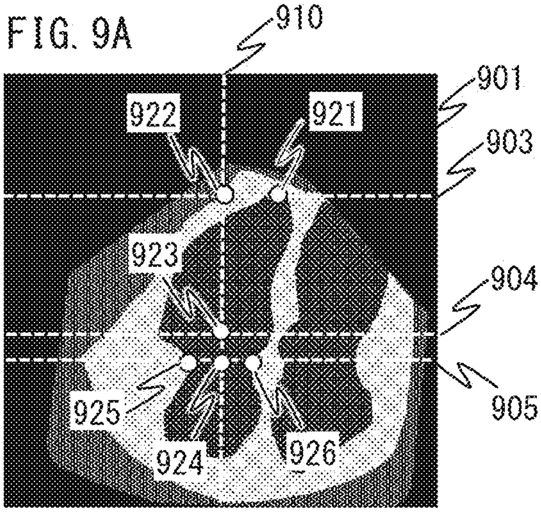
FIGS. 9A to 9C are diagrams showing a method for setting intersecting cross-sections according to a third embodiment.
Figure 9B:
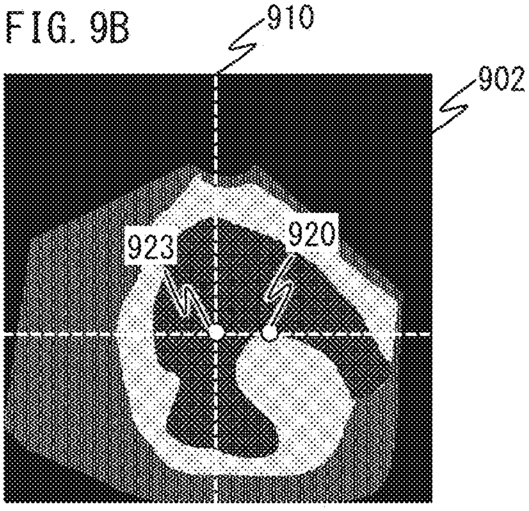
Figure 9C:
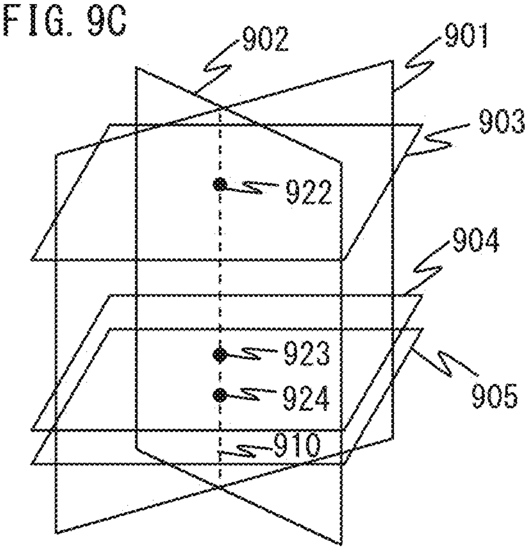

"Another cross section calculated from a reference cross-section before updating" according to this embodiment will be described with reference to FIGS. 9A to 9C. FIG. 9A shows a reference cross-section before updating, which will be referred to as an "A-surface" in this embodiment. The A-surface (initially estimated A-surface) before updating is the same as the reference cross-section (FIG. 7A) before updating in the second embodiment. Further, a cross section 902 obtained by rotating the initially estimated A-surface 901 by 90 degrees about a central axis 910 within the space of an input three-dimensional image will be referred to as a "B-surface." The mode of the B-surface is schematically shown in FIG. 9B. The A-surface is a cross section that enables the simultaneous observation of the four chambers of the heart, while the B-surface is a cross-section that enables the observation of a location referred to as "the crista supraventricularis" where an inflow path joins an outflow path. In this embodiment, the coordinates of the *crista* supraventricularis 920 shown in FIG. 9B are detected from a B-surface cross-section image and used in the calculation of an intersecting cross-section image group.

A method for calculating an intersecting cross-section image group according to this embodiment will continuously be described with reference to FIGS. 9A to 9C. Note that the reference cross-section (initially estimated A-surface 901) before updating is calculated in advance. In this case, first, the locations of an apex 921 and two left and right tricuspid annulus points 925 and 926 are estimated (detected) from the initially estimated A-surface. Then, a midpoint 924 between the two left and right tricuspid annulus points is calculated. Second, an axis (central axis 910) that passes through the calculated midpoint and is orthogonal to an axis connecting the two left and right tricuspid annulus points is calculated. Third, the initially estimated A-surface is rotated by 90 degrees about the calculated central axis to generate a B-surface cross-section image, and the location of the crista supraventricularis on the B-surface cross-section image is detected. Fourth, a point 923 is calculated by perpendicularly projecting the crista supraventricularis 920 onto the central axis 910. As shown in FIG. 9C, the A-surface and the B-surface intersect at the central axis 910. Therefore, the point 923 projected as described above is a point on both the initially estimated A surface and the B surface. Fifth, in the initially estimated A-surface, the apex 921 is perpendicularly projected onto the central axis 910 to calculate the coordinates of a point 922. As a result of these processing, the three points 922, 923, and 924 are present on the central axis 910. Further, planes 903, 904, and 905 that pass through these three points and are orthogonal to the central axis correspond to the intersecting cross-section image group in this embodiment.

The configurations and processing of the image processing apparatus according to this embodiment will be described. The configurations of the image processing apparatus according to this embodiment are the same as those (FIG. 1) of the image processing apparatus according to the first and second embodiments. Further, the processing of an image acquisition unit 41, an intersecting line estimation unit 44, a cross-section information updating unit 45, and a display processing unit 51 is the same as that described in the second embodiment.

Like the second embodiment, a cross-section parameter estimation unit 42 estimates reference cross-section parameters before updating and a central axis used to determine the posture of the right ventricle, using an input three-dimensional image acquired by the image acquisition unit 41. In this embodiment, the cross-section parameter estimation unit 42 further estimates feature information used to determine the parameters of a certain cross section within an intersecting cross-section group, on the basis of another cross-section information calculated from a reference cross-section before updating. The processing will be described in detail in the description of step S603.

Like the first and second embodiments, an intersecting cross-section group acquisition unit 43 acquires a plurality of two-dimensional cross-section images that represent a plurality of cross sections (an intersecting cross-section group) intersecting with a reference cross-section before updating. This embodiment differs from the second embodiment in that the processing is performed using not only the reference cross-section before updating and a central axis but also feature information estimated by the cross-section parameter estimation unit 42. The processing will be described in detail in the description of step S604.

The flowchart of the processing described in this embodiment is the same as the processing (FIG. 6) described in the second embodiment. However, the processing of steps S603 and S604 differs from that described in the second embodiment.

Hereinafter, only the processing steps differing from those in the second embodiment will be described.

(Step S603: Estimation of Feature Information) In step S603, the cross-section parameter estimation unit estimates reference cross-section parameters before updating and a central axis used to determine the posture of the right ventricle from an input three-dimensional image like the second embodiment. In this embodiment, in addition to the above, the cross-section parameter estimation unit estimates feature position information based on the anatomical characteristics of the right ventricle from both another cross-section calculated from a reference cross-section before updating and the reference cross-section before updating. The feature position information is used to determine the central position of an intersecting cross-section group in subsequent processing. Here, the description of the estimation of the initially estimated reference parameters and the central axis, which are the same as the processing in the second embodiment, will be omitted, and only the estimation of the feature position information will be described.

The processing of this step will be described with reference to FIGS. 9A to 9C. By the same processing as in the second embodiment, the two left and right tricuspid annulus points 925 and 926, their midpoint 924, and the central axis 910 are calculated. First, the initially estimated A-surface is rotated by 90 degrees about the central axis 910 to obtain the B-surface (FIG. 9B). Next, the crista supraventricularis 920 is detected from an image of the B-surface, and its point is perpendicularly projected onto the central axis 910. As described at the beginning of this embodiment, the point 923 thus projected is a point on both the initially estimated A-surface and the B-surface. Next, in the initially estimated A-surface, the apex 921 is perpendicularly projected onto the central axis 910 to calculate the point 922. As a result of these processing, the three points 922, 923, and 924 are calculated on the central axis 910. The position of the crista supraventricularis 920 is estimated on the basis of a CNN.

The coordinate values of the three points obtained by the above processing, along with the reference cross-section parameters before updating and the vector of the central axis obtained by the same processing as in the second embodiment, are information obtained as the processing results of this step.

Note that, in addition to the above three points, other feature information points such as the midpoint between the points 922 and 924 and the midpoint between the points 922 and 923 may also be calculated from the above three points. In this manner, it is possible to reduce the bias in the position of an intersecting cross-section image group set in the subsequent processing, which may occur when only the above three points are used.

Further, in this embodiment, the feature information is estimated in both the reference cross-section before updating (initially estimated A-surface) and the B-surface. However, it is also possible to estimate the feature information using only the initially estimated A-surface (that is, the crista supraventricularis that is information obtained from the B-surface is not used). In this case, the processing to detect feature points on an image of the cross section of the B-surface is omitted, enabling a reduction in calculation costs.

(Step S604: Calculation of Intersecting Cross-Section Image Group) In step S604, the intersecting cross-section group acquisition unit 43 acquires an intersecting cross-section image group obtained by cutting the input three-dimensional image at a plurality of cross sections (an intersecting cross-section group) intersecting with the reference cross-section. Here, each of a plurality of intersecting cross-section images constituting the intersecting cross-section image group is a two-dimensional image.

In this embodiment, each central point of the intersecting cross-section image group (the position where the central axis vector passes through the cross sections) corresponds to the position of the point group projected onto the central axis vector that is estimated in step S603. That is, the number of the points estimated in step S603 corresponds to the number of the intersecting cross-section images calculated in this step. The processing other than the above is the same as that in step S604 of the second embodiment.

As described above, according to this embodiment, the "positions" of the anatomical characteristic points of the right ventricle are also considered along with the "posture" of the right ventricle determined by a central axis vector to calculate an intersecting cross-section group. As a result, the variability of intersecting cross-section image groups is reduced between cases, enabling more stable estimation of intersecting lines on the intersecting cross-section image groups.

Fourth Embodiment

Figure 10:
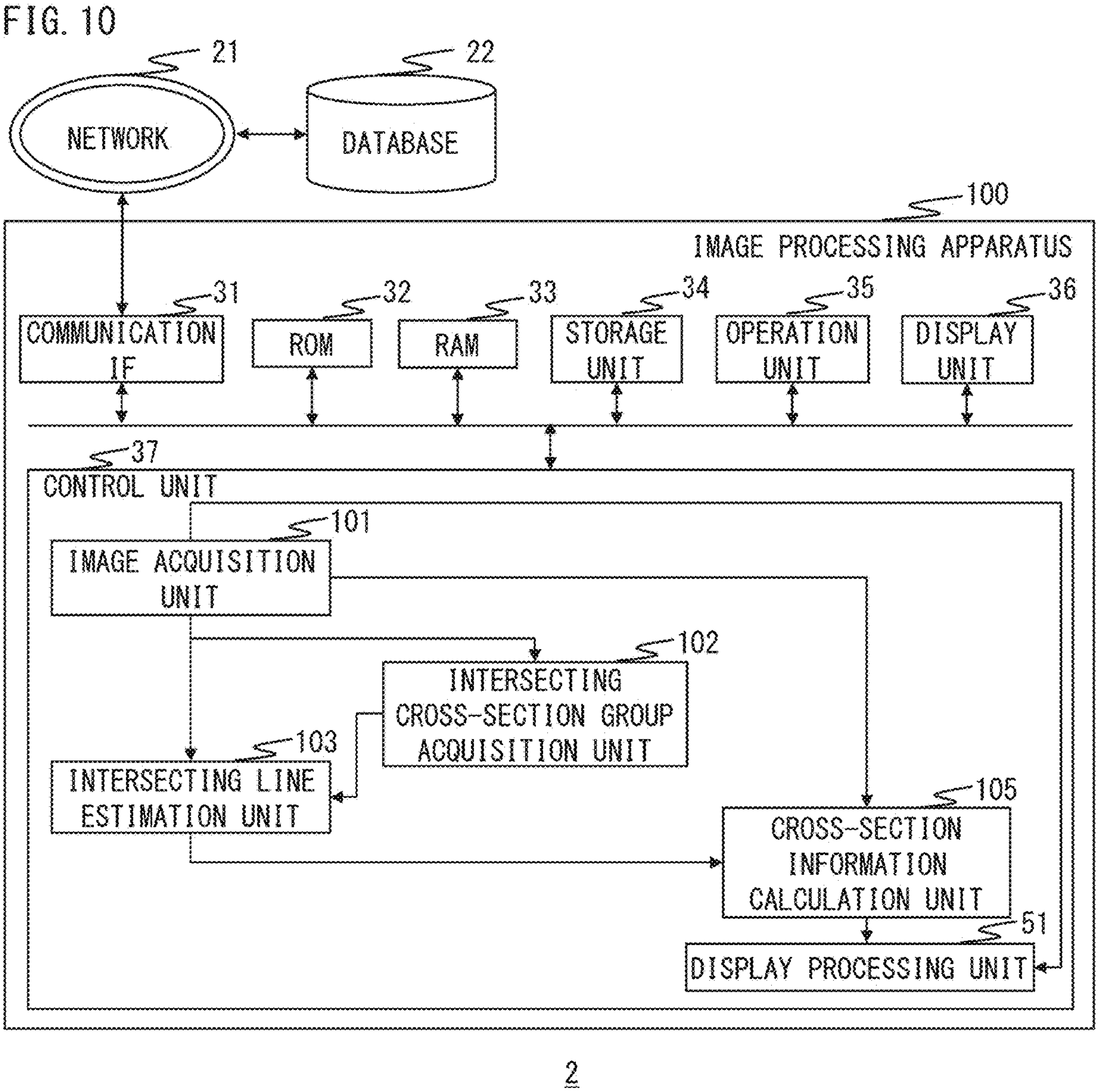
FIG. 10 is a diagram showing the schematic configuration of an image processing apparatus according to a fourth embodiment.

Next, a fourth embodiment will be described. FIG. 10 is a block diagram showing a configuration example of an image processing system (medical image processing system) including an image processing apparatus according to this embodiment. An image processing system 2 includes an image processing apparatus 100 and a database 22. The image processing apparatus 100 is connected to the database 22 to be communicable via a network 21. The network 21 includes, for example, a LAN or a WAN. Note that in this embodiment, the same configurations and processing as those in the first to third embodiments will be denoted by the same symbols, and their detailed descriptions will be omitted.

Like the first to third embodiments, the image processing apparatus 100 according to the fourth embodiment estimates parameters (reference cross-section parameters) that represent the position and posture of a reference cross-section used to observe the right ventricle, using a three-dimensional image as an input image. In the first to third embodiments, the reference cross-section before updating estimated from the input three-dimensional image is used to calculate the intersecting cross-section image group. In this embodiment, an intersecting cross-section image group is directly calculated from an input three-dimensional image without calculating a reference cross-section before updating. In this manner, the calculation of intersecting cross-sections does not depend on the success or failure of the estimation of an initially estimated cross-section. Therefore, even if a reference cross-section before updating is not satisfactorily estimated, such as when the four chambers of the heart are not clearly extracted, it is possible to perform the estimation of the reference cross-section.

Next, each unit of the image processing apparatus 100 will be described. The processing performed by an image acquisition unit 101, an intersecting line estimation unit 103, and a display processing unit 51 in FIG. 10 is the same as that performed by the image acquisition unit 41, the intersecting line estimation unit 44, and the display processing unit 51 in FIG. 1, respectively.

An intersecting cross-section group acquisition unit 102 estimates a group of a plurality of cross-sections (an intersecting cross-section group) assumed to intersect with a reference cross-section that is estimated at a subsequent stage, on the basis of an input three-dimensional image acquired by the image acquisition unit 101. Unlike the first to third embodiments, the intersecting cross-section group is calculated on the basis of only the input three-dimensional image. The processing will be described in detail in the description of step S1102.

A cross-section information calculation unit 105 calculates the parameters of a reference cross-section, using an input three-dimensional image acquired by the image acquisition unit 101 and intersecting line information estimated by the intersecting line estimation unit 103. The processing will be described in detail in the description of step S1104.

Figure 11:
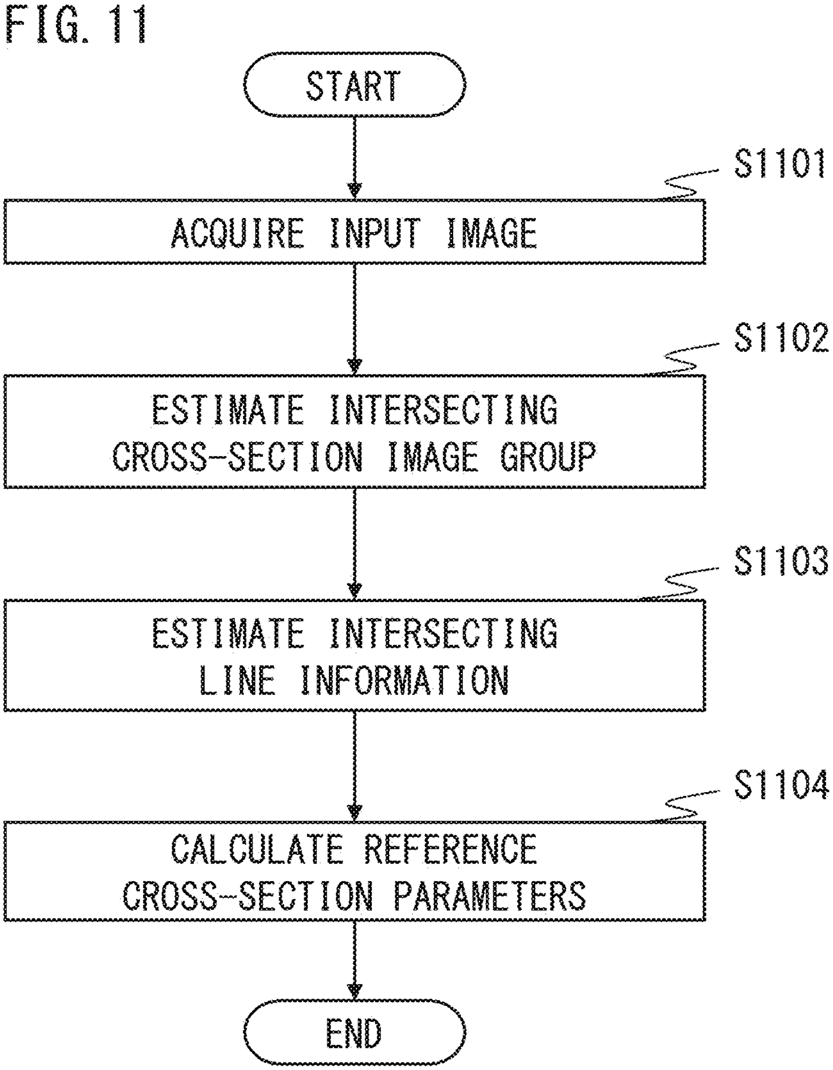
FIG. 11 is a flowchart of the processing performed by the image processing apparatus according to the fourth embodiment.

Hereinafter, an example of the processing performed by the image processing apparatus 100 according to the fourth embodiment will be described with reference to a flowchart shown in FIG. 11. Here, since the processing of steps S1101 and S1103 is the same as that of steps S201 and S204 in FIG. 2, respectively, their descriptions will be omitted.

(Step S1102: Estimation of Intersecting Cross-Section Image Group) In step S1102, the intersecting cross-section group acquisition unit 102 estimates the group of a plurality of cross sections (an intersecting cross-section group) assumed to intersect with a reference cross-section that is to be estimated at a subsequent stage, on the basis of an input three-dimensional image.

Figure 12:
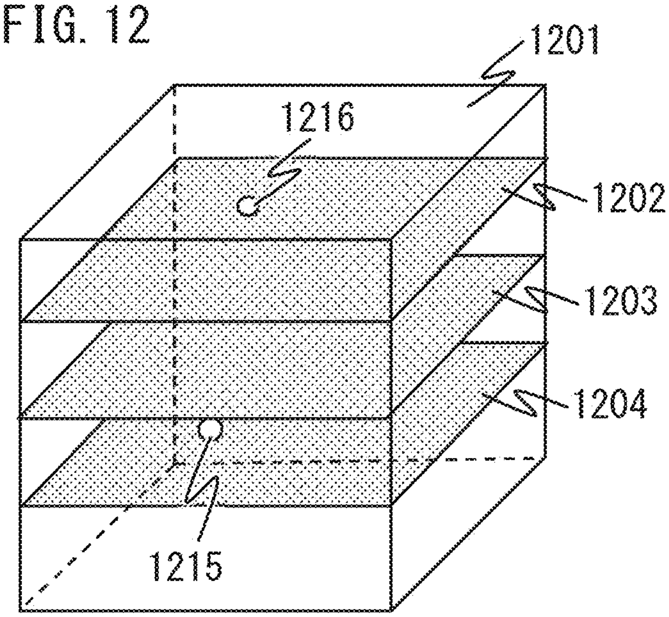
FIG. 12 is a diagram schematically showing the mode of intersecting cross-sections according to the fourth embodiment.

The estimation of an intersecting cross-section image group according to this embodiment will be described with reference to FIG. 12. First, using an input three-dimensional image 1201 as input for a learning model, the positions of a left-and-right-tricuspid-annulus midpoint 1215 and an apex 1216 are detected. A CNN is used as an example of a learning model for detection. Next, cross sections 1202 and 1204 that pass through the points 1215 and 1216, respectively, and are orthogonal to the vertical axis of the input three-dimensional image, as well as a cross section 1203 between the two cross-sections, are calculated. Among the group of the cross sections thus calculated, the cross section 1204 that passes through the left-and-right-tricuspid-annulus midpoint and the cross section 1203 between the two cross-sections correspond to an intersecting cross-section group calculated in this step. The cross section 1202 that passes through the apex is excluded from the intersecting cross-section group because it does not slice through the right and left ventricles and may not calculate intersecting line information in the subsequent processing of step S1103. After that, an image of each intersecting cross-section is calculated using the same processing as that in step S203 of the first embodiment.

(Step S1104: Calculation of Reference Cross-Section Parameters) In step S1104, the cross-section information calculation unit 105 calculates reference cross-section parameters, using an input three-dimensional image acquired by the image acquisition unit 101 and intersecting line information estimated by the intersecting line estimation unit 103.

As described below, the processing of this step is the same as that of step S205 in the first embodiment. First, as a precondition, endpoints 502, 503, 504, and 505 of intersecting lines are calculated by the preceding processing of step S1103 as shown in FIG. 5D. At this time, a known method, i.e., the least squares method is used to calculate an approximate plane that passes through these points, thereby calculating a reference cross-section (surface 520 in FIG. 5D).

Note that any method other than the least squares method may be used, as long as it is a technology to calculate the parameters of one cross-section from the group of a plurality of points present within a three-dimensional image. For example, a CNN or a method based on PCA used in the above related arts is also available. When using such a method based on learning data, it is possible to robustly calculate parameters by performing learning with outliers in advance even if the endpoints of intersecting lines calculated in step S1103 contain the outliers.

As described above, according to this embodiment, an intersecting cross-section image group is directly calculated from an input three-dimensional image without calculating a reference cross-section before updating. In this manner, the calculation of intersecting cross-sections does not depend on the success or failure of the estimation of an initially estimated cross-section. Therefore, even if a reference cross-section before updating is not satisfactorily estimated, such as when the four chambers of the heart are not clearly extracted, it is possible to perform the estimation of the reference cross-section.

OTHER EMBODIMENTS

Further, the disclosed technology may take various embodiments, such as a system, a device, a method, a program, and a recording medium (storage medium). Specifically, the disclosed technology may be applied to systems composed of a plurality of equipment (such as host computers, interface equipment, imaging devices, and web applications) or may be applied to apparatuses composed of one equipment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technology of the present disclosure, it is possible to improve estimation performance when estimating a reference cross-section for three-dimensional images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-190035, filed on Nov. 7, 2023, which is hereby incorporated by reference herein in its entirety.

What is claimed is:

1. An image processing apparatus comprising:

a processor; and a memory storing a program which, when executed by the processor, causes the image processing apparatus to:

perform an image acquisition processing to acquire a three-dimensional image containing a subject as an object to be imaged;

perform an intersecting cross-section acquisition processing to acquire, from the three-dimensional image, information on a plurality of intersecting cross-sections that intersect with a prescribed reference cross-section;

perform an intersecting line information acquisition processing to, on a basis of the information on the plurality of intersecting cross-sections, acquire intersecting line information that represents information on intersecting lines where the plurality of intersecting cross-sections intersect with the reference cross-section; and perform a cross-section information acquisition processing to, on a basis of the intersecting line information, acquire reference cross-section information that represents information on the reference cross-section.

2. The image processing apparatus according to claim 1, wherein the program further causes the image processing apparatus to:

perform a position and posture acquisition processing to acquire information containing at least one of a position and a posture of the subject from the three-dimensional image, wherein the intersecting cross-section acquisition processing acquires the information on the plurality of intersecting cross-sections on a basis of the information acquired by the position and posture acquisition processing.

3. The image processing apparatus according to claim 1, wherein the program further causes the image processing apparatus to:

perform an estimation result acquisition processing to acquire an estimation result of the information on the reference cross-section from the three-dimensional image, wherein the intersecting cross-section acquisition processing acquires the information on the plurality of intersecting cross-sections on a basis of the estimation result, and the cross-section information acquisition processing updates the estimation result on a basis of the information on the plurality of intersecting cross-sections, thereby acquiring the reference cross-section information.

4. The image processing apparatus according to claim 1, wherein the plurality of intersecting cross-sections intersect with the reference cross-section at different positions.

5. The image processing apparatus according to claim 3, wherein the estimation result contains information on at least one of a position and a posture of the reference cross-section.

6. The image processing apparatus according to claim 3, wherein the reference cross-section information contains information on at least one of a position and a posture of the reference cross-section related to updating of the estimation result.

7. The image processing apparatus according to claim 1, wherein the program further causes the image processing apparatus to:

perform a central axis acquisition processing to acquire information on a central axis representing an orientation of the subject in the three-dimensional image, wherein the intersecting cross-section acquisition processing acquires a plurality of cross sections intersecting with the central axis as the plurality of intersecting cross-sections, on a basis of the information on the central axis.

8. The image processing apparatus according to claim 7, wherein the cross-section information acquisition processing acquires the reference cross-section information on a basis of the information on the central axis and the plurality of intersecting cross-sections.

9. The image processing apparatus according to claim 7, wherein the central axis represents an axis on the reference cross-section.

10. The image processing apparatus according to claim 7, wherein the program further causes the image processing apparatus to:

perform an estimation result acquisition processing to acquire from the three-dimensional image an estimation result of the information on the reference cross-section, wherein the intersecting cross-section acquisition processing acquires the plurality of intersecting cross-sections, on a basis of the estimation result of the information on the reference cross-section and feature information acquired from the central axis.

11. The image processing apparatus according to claim 10, wherein the estimation result acquisition processing further calculates information on an auxiliary cross-section on a basis of the estimation result of the information on the reference cross-section, wherein the intersecting cross-section acquisition processing further calculates feature information on the subject from the estimation result and the information on the auxiliary cross-section, and acquires the plurality of intersecting cross-sections on a basis of the feature information.

12. The image processing apparatus according to claim 1, wherein the subject represents a heart of a human body, and the reference cross-section represents at least one of an apex four-chamber image and a right ventricle short-axis image.

13. The image processing apparatus according to claim 1, wherein the three-dimensional image represents a three-dimensional ultrasound image.

14. The image processing apparatus according to claim 3, wherein the cross-section information acquisition processing acquires the estimation result through inference processing based on the three-dimensional image.

15. The image processing apparatus according to claim 1, wherein the intersecting line information acquisition processing acquires the information on the intersecting lines through inference processing based on the three-dimensional image.

16. The image processing apparatus according to claim 1, wherein the three-dimensional image represents any of an ultrasound image obtained by an ultrasound diagnostic device, an X-ray computed tomography (CT) image obtained by an X-ray CT device, and a magnetic resonance imaging (MRI) image obtained by an MRI device.

17. The image processing apparatus according to claim 3, wherein the estimation result acquisition processing acquires the information on the reference cross-section by using a learning model trained to output a parameter representing the information on the reference cross-section within the three-dimensional image, with the three-dimensional image as input.

18. An image processing method comprising:

acquiring a three-dimensional image containing a subject as an object to be imaged;

acquiring, from the three-dimensional image, information on a plurality of intersecting cross-sections intersecting with a prescribed reference cross-section;

acquiring intersecting line information that represents information on intersecting lines where the plurality of intersecting cross-sections intersect with the reference cross-section, on a basis of the information on the plurality of intersecting cross-sections; and acquiring reference cross-section information that represents information on the reference cross-section, on a basis of the intersecting line information.

19. A non-transitory computer-readable medium that stores a program for causing a computer to execute each any one of a plurality of steps in the image processing method according to claim 18.

20. An image processing apparatus comprising:

an image acquisition unit configured to acquire a three-dimensional image containing a subject as an object to be imaged;

an intersecting cross-section acquisition unit configured to acquire, from the three-dimensional image, information on a plurality of intersecting cross-sections that intersect with a prescribed reference cross-section;

an intersecting line information acquisition unit configured to, on a basis of the information on the plurality of intersecting cross-sections, acquire intersecting line information that represents information on intersecting lines where the plurality of intersecting cross-sections intersect with the reference cross-section; and a cross-section information acquisition unit configured to, on a basis of the intersecting line information, acquire reference cross-section information that represents information on the reference cross-section.

* * * * *